(12) United States Patent
Tanaka

(10) Patent No.: US 7,256,819 B1
(45) Date of Patent: Aug. 14, 2007

(54) ORDER PROCESSING METHOD AND SYSTEM FOR IMAGE OUTPUT SERVICE, AND ORDER INFORMATION GENERATING APPARATUS, ORDER RECEIVING APPARATUS, AND DIGITAL CAMERA USED IN THE METHOD

(75) Inventor: Hiroshi Tanaka, Saitama-ken (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 09/219,121

(22) Filed: Dec. 23, 1998

(30) Foreign Application Priority Data

Dec. 25, 1997 (JP) .................................. 9-358137

(51) Int. Cl.
 H04N 5/225 (2006.01)
 H04N 7/76 (2006.01)
 H04N 5/222 (2006.01)

(52) U.S. Cl. .............................. 348/207.1; 348/333.01; 348/231.3

(58) Field of Classification Search ........... 348/333.01, 348/333.02, 333.04, 333.11, 333.12, 207.11, 348/207.2, 231.3, 231.6, 231.5, 207.1
See application file for complete search history.

(56) References Cited

U.S. PATENT DOCUMENTS

| | | | | |
|---|---|---|---|---|
| 5,440,343 A | * | 8/1995 | Parulski et al. | 348/316 |
| 5,448,377 A | * | 9/1995 | Kinoshita et al. | 358/452 |
| 5,502,485 A | * | 3/1996 | Suzuki | 348/231.6 |
| 5,710,954 A | * | 1/1998 | Inoue | 348/333.01 |
| 5,737,491 A | * | 4/1998 | Allen et al. | 348/211.3 |
| 5,983,200 A | * | 11/1999 | Slotznick | 705/26 |
| 6,012,145 A | * | 1/2000 | Mathers et al. | 711/164 |
| 6,198,526 B1 | * | 3/2001 | Ohtsuka | 348/231.6 |
| 6,331,903 B1 | * | 12/2001 | Nakazawa et al. | 358/487 |
| 6,342,922 B1 | * | 1/2002 | Mizoguchi | 348/355 |
| 6,353,487 B1 | * | 3/2002 | Fredlund et al. | 358/487 |
| 6,381,582 B1 | * | 4/2002 | Walker et al. | 705/26 |
| 6,529,236 B1 | * | 3/2003 | Watanabe | 348/230.1 |
| 2001/0030687 A1 | * | 10/2001 | Kondo et al. | 348/97 |

FOREIGN PATENT DOCUMENTS

JP A-7-282282 10/1995

* cited by examiner

*Primary Examiner*—David Ometz
*Assistant Examiner*—James M. Hannett
(74) *Attorney, Agent, or Firm*—Birch, Stewart, Kolasch & Birch, LLP

(57) ABSTRACT

When order information is recorded in a recording medium and an image output service is requested using this order information, the content of a new order is not confused with that of an old order and a user's intention can be conveyed accurately to a service provider in the case where orders are placed repeatedly by using the same recording medium. The user is caused to confirm all order information recorded in the recording medium by using an index relating images to the quantity of prints both displayed on a screen, for example. The user's intention is confirmed by an order confirmation operation carried out by the user, and the intention is provided to the service provider as confirmed order information recorded in the recording medium.

33 Claims, 5 Drawing Sheets

[CONTROL INFORMATION]
ORDER FILE VERSION = Ver 1.00
ORDER FILE GENERATION DATE = 1999.1.1

[PRINTING INSTRUCTION 1]
PRINT TYPE = INDEX PRINT
PRINTING TARGET = *. JPG
QUANTITY = 2
......

[PRINTING INSTRUCTION 2]
......

[PRINTING INSTRUCTION 3]
......

(EOF)

ORDER PROCESSING METHOD AND SYSTEM FOR IMAGE OUTPUT SERVICE, AND ORDER INFORMATION GENERATING APPARATUS, ORDER RECEIVING APPARATUS, AND DIGITAL CAMERA USED IN THE METHOD

BACKGROUND OF THE INVENTION

1. Field of the Invention

The present invention relates to order processing in an image output service. More specifically, the present invention relates to a method and a system for order processing, as well as to an order information generating apparatus, a digital camera, and an order receiving apparatus for the method or the system used in the case where order information instructing the size and the quantity of an output image is recorded in a recording medium and provided to a service provider.

2. Description of the Related Art

In various kinds of services provided by a computer system, order information for requesting a service is recorded as digital data in a removable recording medium or in a hard disc and utilized by being input to the system.

For example, in Japanese Unexamined Patent Publication No. 7(1995)-282282, a system for an output service provider used by a design office or the like to output an edited image designed by using a computer has been disclosed. This system obtains information such as the name and address of an orderer, the kind and method of an output apparatus or the like from a recording medium, and efficiently outputs and delivers the edited image.

In the field of a digital photographic service, a network photograph service using the Internet has been being provided. In such a service, a user generates order information in a digital format on a personal computer and an order is placed by transferring the information to a system of a service provider via a recording medium such as a floppy disc or via the Internet.

In an image output service such as the one in the above, order information is sometimes provided repeatedly via one and the same recording medium. In this case, in a conventional order processing, unintentional output happens to be carried out due to new order information added to old order information.

There are various methods of preventing old order information from being left in a recording medium. For example, order information is recorded in a recording medium after old order information having been recorded therein is erased. Alternatively, new order information may be written over old order information. However, in these methods, in the case where order information has been recorded once and needs to be changed or added, the order information needs to be input again.

Meanwhile, another method wherein a system to carry out output processing deletes order information at the time of output completion is also possible. Alternatively, a system to carry out output processing may return a recording medium to a customer after adding information indicating that existing order information has been processed to the existing order information in the recording medium. In this manner, the system of a service provider can distinguish new order information from old order information even in the case where another order is placed later by using the same recording medium.

However, general writing processing in a recording medium always has a potential risk of medium breakdown or data destruction. Therefore, it is not preferable for a service provider to carry out data writing or deleting processing on a recording medium brought in by a customer. Since order information functions as an order slip, the situation wherein a system of a service provider which receives an order can easily carry out data rewriting processing is not preferable.

SUMMARY OF THE INVENTION

Based on consideration of the above problems, an object of the present invention is to accurately convey a user's intention to a service provider without a confusion of old order information and new order information in the case where an output service is requested repeatedly by using one and the same recording medium. Furthermore, the present invention aims to achieve this object without writing processing carried out by the service provider on the recording medium brought in by the user.

The present invention proposes an order processing method of solving the above problems, and a system for processing an order according to the method. The present invention also proposes an order information generating apparatus, a digital camera, and an order receiving apparatus as components of the order processing system.

An order processing method of the present invention will be explained first. The order processing method of the present invention is an order processing method used in an image output service such as a photograph printing service, and comprises the steps of:

obtaining image data by photographing an image or reading a recording medium;

replaying the obtained image data as a visible image on a display medium;

receiving an output instruction regarding the image data, the output instruction being input from an input apparatus, based on the replay of the image data;

generating order information describing the output instruction in a predetermined data format and recording the order information in a recording medium;

displaying on the display medium all image data output of which has been instructed and the content of the instruction regarding the image data so that a customer to request the image output service can confirm the content of the output instruction;

certifying an order by recording confirmed order information in the recording medium when a predetermined order confirmation operation indicating that the order confirmation has been completed is accepted; and carrying out the image output service based on the order information recorded in the recording medium only when the confirmed order information has been recorded in the recording medium.

The "all image data output of which has been instructed" mean image data which have output instructions regarding themselves having been recorded as order information in a recording medium. Therefore, the image data mean not only image data output of which has been instructed by an operation carried out at the present time but also by an operation having been carried out earlier.

In other words, in the method of the present invention, a user is caused to confirm all order information recorded in a recording medium and to carry out an "order confirmation" operation so that the user's intention is confirmed thereby. In this manner, an unintentional order is prevented from being placed by providing the user's intention as "confirmed order information" to a service provider.

The order information may be recorded in a recording medium together with, or separately from, image data. As a "recording medium", a memory card such as SSFDC, Compact Flash, PC card or the like may be used. An FD, MD, Zip, MO or the like may also be used.

The above order processing method can be realized by an order processing system comprising a terminal dedicated for generating order information and an order receiving apparatus for obtaining and processing the order information. Alternatively, a digital camera may include a function to generate the order information and a service provider may provide a service by using the order receiving apparatus alone.

In other words, an order processing system of the present invention is an order processing system for an image output service and comprises an order information generating apparatus and an order receiving apparatus. The order processing system is characterized by that the order information generating apparatus comprises:

data obtaining means for obtaining image data by photographing an image or reading a recording medium; display means for replaying the obtained image data as a visible image on a display medium;

instruction receiving means for receiving an output instruction regarding the image data, the output instruction being input from an input apparatus, based on the replay of the image data;

order information recording means for generating order information describing the output instruction in a predetermined data format and recording the order information in a recording medium;

order content confirming means for displaying on the display medium all image data output of which has been instructed and the content of the instruction regarding the image data so that a customer to request the image output service can confirm the content of the output instruction; and order certifying means for confirming an order by recording confirmed order information in the recording medium when a predetermined order confirmation operation indicating that the order confirmation has been completed is accepted; and the order receiving apparatus comprises:

data reading means for reading the order information recorded in the recording medium;

confirmed information certifying means for certifying whether or not the conformed order information has been recorded in the recording medium; and output instructing means for instructing output of the image data to various kinds of output apparatuses based on the order information recorded in the recording medium only when the confirmed order information has been recorded in the recording medium.

An order information generating apparatus of the present invention constitutes the above order processing system and comprises:

data obtaining means for obtaining image data by photographing an image or reading a recording medium;

display means for displaying the obtained image data as a visible image on a display medium;

instruction receiving means for receiving an output instruction regarding the image data, the output instruction being input from an input apparatus, based on the replay of the image data;

order information recording means for generating order information describing the output instruction in a predetermined data format and recording the order information in a recording medium;

order content confirming means for displaying on the display medium all image data output of which has been instructed and the content of the instruction regarding the image data so that a customer to request an image output service can confirm the content of the output instruction; and order certifying means for certifying an order by recording confirmed order information in the recording medium when a predetermined order confirmation operation indicating that the order confirmation has been completed is accepted.

The "data obtaining means" is a medium drive or the like for reading a removable recording medium described in the above. Alternatively, the data obtaining means may be photographing means such as a digital camera or a sticker printing machine installed on a street. In a digital photographic service, image data digitized by a laboratory may be stored as they are by the laboratory. In such a case, the "recording medium" is a hard disc of the laboratory system, and the data obtaining means is means for searching the hard disc to read image data.

The "display medium" means a CRT display or a liquid crystal monitor, and the "display means" is hardware and a program to control output to the display medium.

The "input apparatus" means an operation button, a pointing device, a keyboard, or the like. The "instruction receiving means" is a program for displaying available instructions on the monitor or the like and for receiving selection input from the customer.

The "order content confirming means" is a program which displays on the monitor an index of images whose output has been instructed, for example.

At this time, the "predetermined order confirmation operation" means an operation wherein the customer presses a confirmation button by using the input apparatus when the order content confirming means displays the confirmation button on the monitor, for example. Alternatively, an order confirmation button may be provided as hardware in the order information generating apparatus.

The "order certifying means" records the confirmed order information in the recording medium, according to the operation. The "confirmed order information" may not necessarily mean one individual form of data. In other words, information having a different meaning, such as file property information, may be used as the confirmed order information.

An order receiving apparatus of the present invention, which also constitutes the above order processing system, receives an order for the image output service by obtaining order information in a digital format, and comprises:

data reading means for reading the order information describing an output instruction regarding image data from a recording medium;

confirmed information certifying means for certifying whether or not confirmed order information indicating that a customer to request the image output service has confirmed the content of the output instruction is recorded in the recording medium; and output instructing means for instructing to various kinds of output apparatuses output of the image data, based on the order information recorded in the recording medium only when the confirmed order information is recorded in the recording medium.

The "data reading means" is a medium drive or the like for reading a recording medium. The "output apparatus" is a digital photographic printer, for example.

A digital camera of the present invention will be explained next. The digital camera of the present invention realizes the order information generating apparatus in the form of a digital camera. The digital camera comprises:

photographing means for obtaining image data by photographing an image;

image recording means for recording the obtained image data in a recording medium;

display means for replaying the obtained image data as a visible image on a monitor attached to the digital camera;

instruction receiving means for receiving an output instruction regarding the image data, the output instruction being input from an operation button or the like, based on the replay of the image data;

order information recording means for recording order information describing the output instruction in a predetermined data format in the recording medium;

order content confirming means for displaying on the monitor all image data output of which has been instructed and the content of the instruction regarding the image data so that a customer to request the image output service can confirm the content of the output instruction; and order certifying means for certifying an order by recording confirmed order information in the recording medium when a predetermined order confirmation operation indicating that the order confirmation has been completed is accepted.

In actual order processing, the content of an order may be changed after the order has been confirmed. In such a case, the order confirmation operation needs to be carried out again. In another case, it is possible for image data whose output has been instructed to be deleted after the order confirmation operation. In this case, if the order information is provided as it is, the order receiving apparatus cannot obtain the image data to be output, and the output processing cannot be carried out. Therefore, in such a case, the order confirmation operation needs to be canceled. It is preferable for the digital camera to have means for manually or automatically canceling the order confirmation operation based on the operation described above.

In other words, it is preferable for the digital camera to further comprise confirmation operation canceling means for canceling the order confirmation operation when the conformed order information is updated after having been recorded in the recording medium and/or when image data representing at least one image recorded in the recording medium is deleted.

At this time, when all image data output of which has been instructed are deleted from the recording medium, the confirmation operation canceling means may delete the order information itself. However, the case where "all image data output of which has been instructed are deleted from the recording medium" means the case where deletion of all images is instructed, or no image is recorded in the recording medium as a result of deletion of one image, or deletion of one image leads to a state wherein no image to be output is present in the recording medium, for example.

Regarding a form of the "order information", a plurality of forms are possible. The order information may be recorded as a file, or as accompanying information of image data, or by using a combination of these methods, for example. The "confirmed order information" may be recorded in a recording medium as data or a file separated from the order information in such a form. However, in order to save memory space, it is preferable for the confirmed order information to be recorded by using the order information.

For example, as a form of the confirmed order information in the case of order information recorded in an order file, the following methods are possible. One method is to express the confirmed order information as a hidden property of the order file and to confirm an order by setting the hidden property to "visible" by using the order certifying means. Another methods is to express the confirmed order information as a read/write property of the order file and to confirm an order by setting the read/write property to "read-only" by using the order certifying means. Furthermore, an order can be confirmed when the order certifying means describes a valid order file generation date. For example, the order is confirmed if the order file generation date described in the order file is valid, and is not confirmed if the date is invalid such as "0000/00/00". The order can also be confirmed when the order certifying means describes a character code meaning order confirmation completion in the order file. For example, the confirmed order information may be described by "OrderFix=Yes" if the order has been confirmed, while "OrderFix=No" is described if otherwise. A code other than a character code may also be used.

Likewise, in the case where image data representing each image are recorded as an image file in a recording medium and order information is described in the file as accompanying information included in the image file, an order may be confirmed when the order certifying means describes in the image file a character code or the like meaning order confirmation completion. However, since confirmed order information is necessary for each order, not for each image, the confirmed order information may not necessarily be embedded in all image files. Therefore, the confirmed order information may be embedded in an image file having a smallest or largest image frame number among the image files output of which is instructed, for example.

Furthermore, in order to improve reliability of the confirmed order information, a plurality of order confirmation forms in the above may be adopted. In other words, the confirmed order information may be described by the read/write property as well as an order confirmation code in an order file, for example.

It is preferable for the digital camera to comprise operation prompting means for prompting order confirmation operation execution by a user of the service. This means may be a lamp which flashes red when an order has not been confirmed and green if otherwise. More preferably, a message such as "confirm the content of orders before order placement" may be displayed on the monitor.

If a lamp is used, it may be ON constantly. However, if a message on the monitor is adopted, it cannot be displayed constantly. It is preferable for the message to be displayed when a user brings a memory card or the like to a service provider. For example, the message may be shown when power is switched off. In this case, since no message can be displayed when the power is completely off, the operation urging means needs to detect the power-off operation, display the message for a predetermined period, and actually switch the power off. As timing of the message display, the time when a memory card is pulled out is also possible, for example.

The order processing method and system of the present invention causes a user to confirm all order information recorded in a recording medium and to carry out an order confirmation operation in order to certify the user's intention. Therefore, the user's intention is provided to a service provider after being recorded as confirmed order information in the same recording medium. In this manner, even when order information having been input before still exists in the recording medium, the user notices its presence, and no unnecessary order is placed. The service provider can carry out order processing according to the confirmed order information, and no erroneous processing which does not meet the user's intention is carried out.

The order information generating apparatus of the present invention generates the order information and causes a user to carry out the order confirmation operation. When such an apparatus is installed in a laboratory or the like, a user only has to record image data to be output in a recording medium and to bring the recording medium. Therefore, the user does not need to purchase expensive equipment.

The order receiving apparatus of the present invention reads the order information and the confirmed order information, and provides an output service based on the information having been read. Unlike a conventional order receiving apparatus, the order receiving apparatus of the present invention does not carry out the service when no order confirming operation has been carried out. Therefore, a problem between a user and a service provider due to erroneous order content can be prevented in advance, and printing paper can be saved since no unnecessary printing is carried out.

The digital camera of the present invention comprises an order information generating function equivalent to that of the order information generating apparatus. By using this digital camera, a user can generate order information without going to a service provider or purchasing expensive equipment such as a personal computer. Particularly in the case of a digital camera, one recording medium is often used repeatedly and it is more likely for new order information to coexist with old order information. Therefore, the effect of preventing an erroneous order by causing a user to confirm the content of an order and to carry out the order confirmation operation is substantial.

Furthermore, in the case where the order information is updated or image data are deleted, if the digital camera further comprises a function to automatically cancel the order confirmation operation executed in the past, a change after the confirmation can be dealt with flexibly and no confusion will occur in a service provider's system due to a contradiction between the content of an order and image data.

Moreover, if the digital camera comprises a function to delete order information when the order information becomes invalid as a result of image data deletion by a user, confusion caused by meaningless information remaining in the recording medium will not occur in a later operation.

If the confirmed order information is expressed by using a hidden property or a read/write property of an order file when the order information is described in the order file and then recorded in a recording medium, the property is maintained by the file regardless of presence or absence of the order confirming function. Therefore, it is not necessary to have a recording area for the confirmed order information, which leads to higher efficiency in data recording. The same effect can be obtained by expressing the confirmed order information by using the date of order file generation to be recorded in the order file.

Meanwhile, if the confirmed order information is independently described by a code or a key word expressing the information in the order file, it is easier to understand whether or not an order information has been confirmed than in the case where the order information is described in the above manner, although the file size increases.

Some digital cameras do not have the order file generating function and record the order information in an image file. For such cameras, if the confirmed order information is embedded in any one of the image files, the function of the present invention is easily incorporated.

Furthermore, if the confirmed order information is described in a recording medium in more than 2 forms, the reliability of the confirmed order information is improved.

When a user has forgotten to carry out the order confirmation operation despite of his/her intention to request an output service, a service provider notifies the user of the fact that no order confirmation operation has been carried out. In this case, no unnecessary output is carried out, and the user has to carry out the order confirmation operation to request the service. If the above digital camera comprises the function to display a message or the like to urge the order confirmation operation execution by a user, such a missing operation will be avoided. For example, if a message is displayed for a predetermined period on the monitor when the power is switched off or when the recording medium is pulled out from the camera, omitting the operation can be reliably prevented.

DESCRIPTION OF THE PREFERRED EMBODIMENTS

Figure 1:
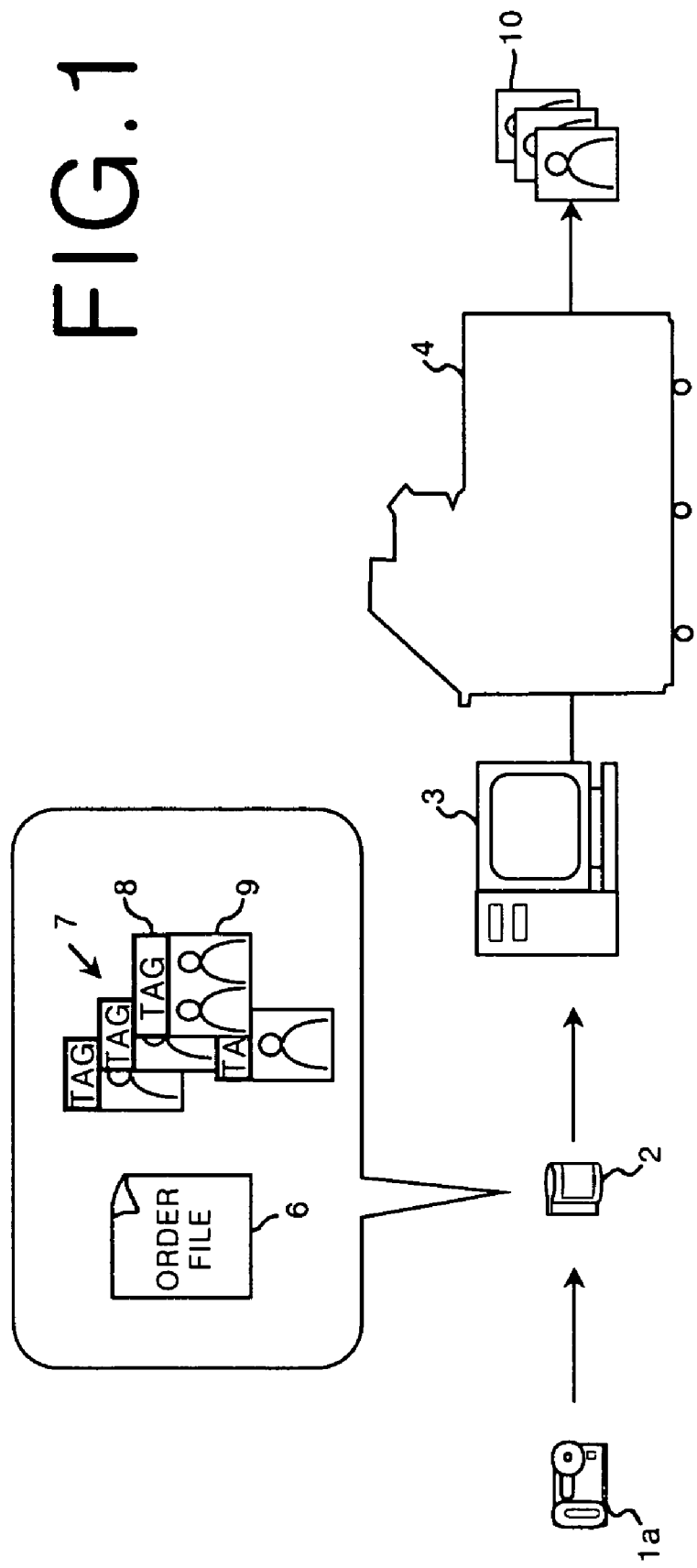
FIG. 1 is a diagram showing an embodiment of an order processing system of the present invention.

Hereinafter, embodiments of the present invention will be explained with reference to the accompanying drawings. FIG. 1 shows an embodiment of an order processing system of the present invention, and the order information generating apparatus described in the above is realized as a digital camera in this embodiment.

In FIG. 1, a digital camera 1a comprises a liquid crystal display monitor and records image data obtained by photographing in a memory card 2 detachable from the body of the digital camera. An order receiving apparatus 3 is a computer comprising peripheral equipment and a program for obtaining an image, processing the image, and instructing output of the image to a printer. A digital printer 4 is a known printer which outputs a print of input image data according to a given instruction.

In this embodiment, the digital camera 1a has 2 modes of recording, namely a printing mode and a non-printing mode. A user can select either one of the recording modes before photographing. When the printing mode has been selected, tone processing appropriate for print output is automatically carried out on image data obtained by photographing. The processed image data are recorded in the memory card 2 at a highest resolution and without being compressed. When the non-printing mode has been selected, the user can manually set the resolution or a compression rate for recording, and image data obtained by photographing are recorded at the resolution and the compression rate set by the user.

The digital camera 1a in the above has 5 operation modes. In a normal photographing mode, image data obtained by photographing are recorded in the memory card 2 as they are. In a preview photographing mode, an image immediately after photographing is displayed on the monitor belonging to the camera, and the image is recorded in the memory card 2 or canceled without being recorded, in response to an instruction by the user. In a one-frame replay mode, images recorded in the memory card 2 are displayed on the monitor one by one. In an index replay mode, images recorded in the memory card 2 are displayed on the monitor in blocks of several frames. In an erasing mode, an image frame selected from the images in the memory card 2 or all images therein are erased and the memory card is formatted if necessary.

Figure 2:
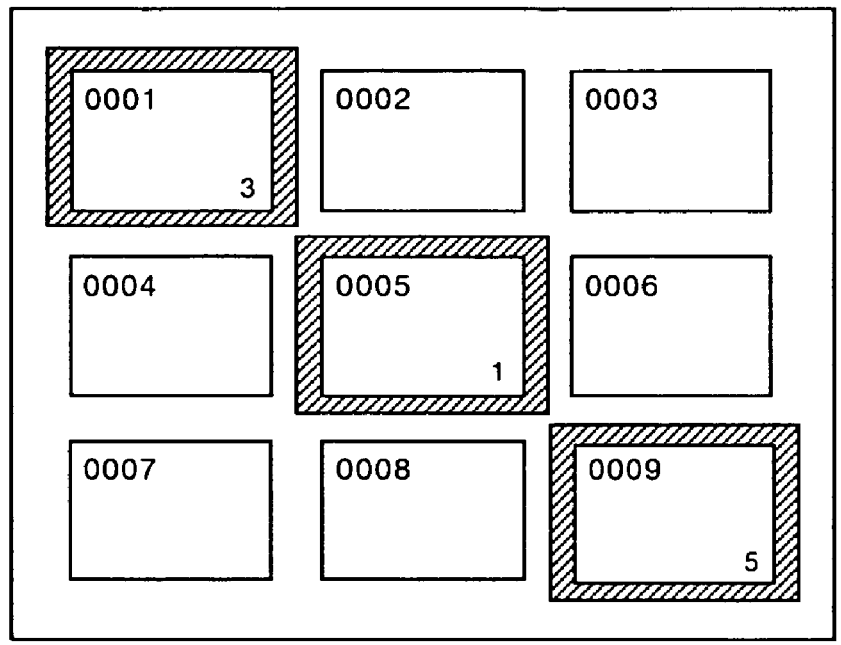
FIG. 2 is a diagram showing an example of a monitor screen in an order confirmation mode.

Furthermore, the digital camera 1a has a function to manage the order information and confirmed order information in each of the above operation modes. In addition to this function, a function to confirm an order (an order confirmation mode), which is characteristic to the present invention, is also incorporated. In the order confirmation mode, frames of images to be output and images not to be output are distinguished from each other, and displayed as an index. For example, FIG. 2 shows the case where the images to be output have thick frames and an instructed quantity of prints is shown in the lower right corner of each image to be output.

Generation of the order information can be carried out in the preview photographing mode, one-frame replay mode, index replay mode, and order confirmation mode.

Figure 3:
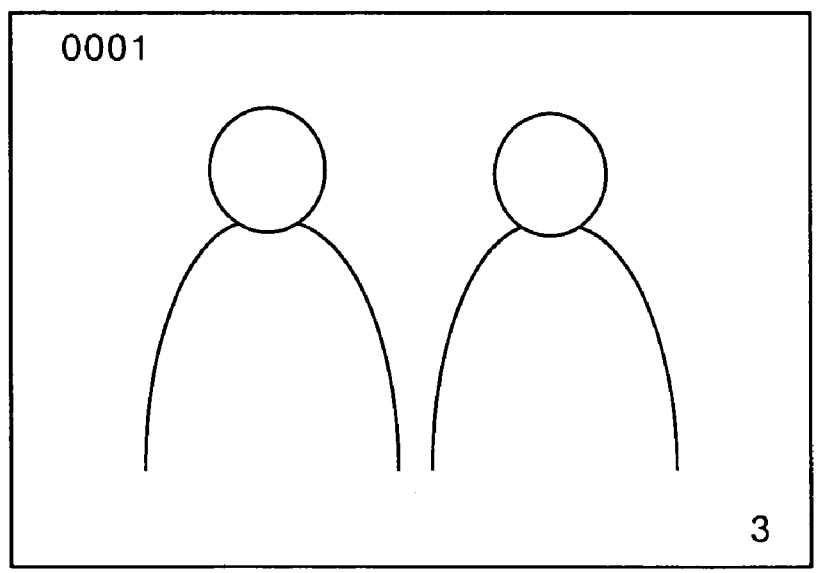
FIG. 3 is a diagram showing an example of the monitor screen in a replay mode.

In the preview photographing mode, only when the user has selected the printing mode as the recording mode, is the quantity of prints (initially 0) displayed together with the image during preview of the image, as shown in FIG. 3. The user can set the quantity of prints by changing the displayed quantity by carrying out a predetermined button operation. In this embodiment, when the user has selected the non-printing mode as the recording mode, the number of prints is not displayed, and the user cannot carry out the quantity setting. In other words, convenience is improved by linking the order information generating function with the recording mode setting.

In the one-frame replay mode and the index replay mode, only when the user carries out a predetermined operation during the image replay, is the quantity of prints displayed so that the user can set the quantity.

In the one frame replay mode, a print quantity setting screen looks like the screen shown in FIG. 3. The user can set the quantity by changing the displayed quantity by carrying out a predetermined button operation.

In the index replay mode, the quantity setting screen looks like the screen shown in FIG. 2, as in the order confirmation mode. The user selects a frame by carrying out a predetermined button operation and setting the quantity for the selected frame in the same manner as in the one-frame replay mode.

In the order confirmation mode, the quantity is already displayed on the screen, and the user can select a desired frame and set the quantity for the selected frame.

In each mode, the order content having been set is recorded as order information in a predetermined format in the memory card 2.

As shown in FIG. 1, in this embodiment, the order information is described in an order file 6 and also in a tag area 9 of an image file 7. An order regarding only one image is described in the image file 7 and an order regarding a plurality of images, such as an order for an index print generation, is described in the order file 6.

Figure 4:
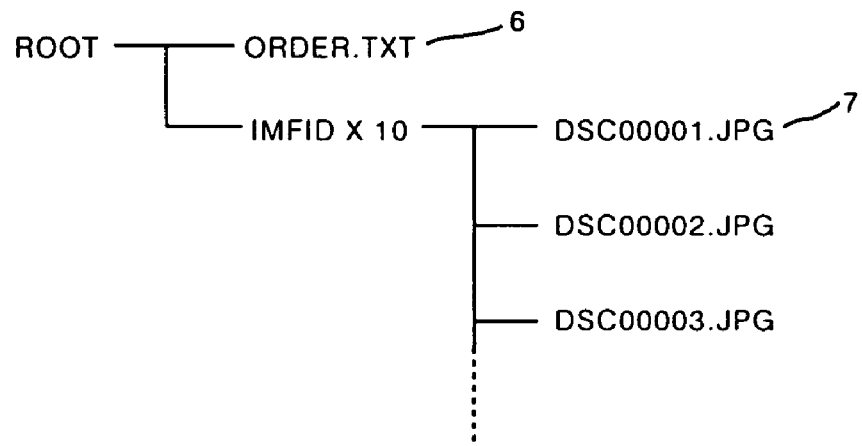
FIG. 4 is a diagram showing an example of a form of recording a file.

The order file 6 and the image file 7 are classified into directories as in a file system of a personal computer, and recorded in the memory card 2. In the example shown in FIG. 4, the order file 6 (ORDER.TXT) and a directory IMFIDX10 exist under a root directory, and the image file 7 is stored under the directory INFIDX10.

Figure 5:
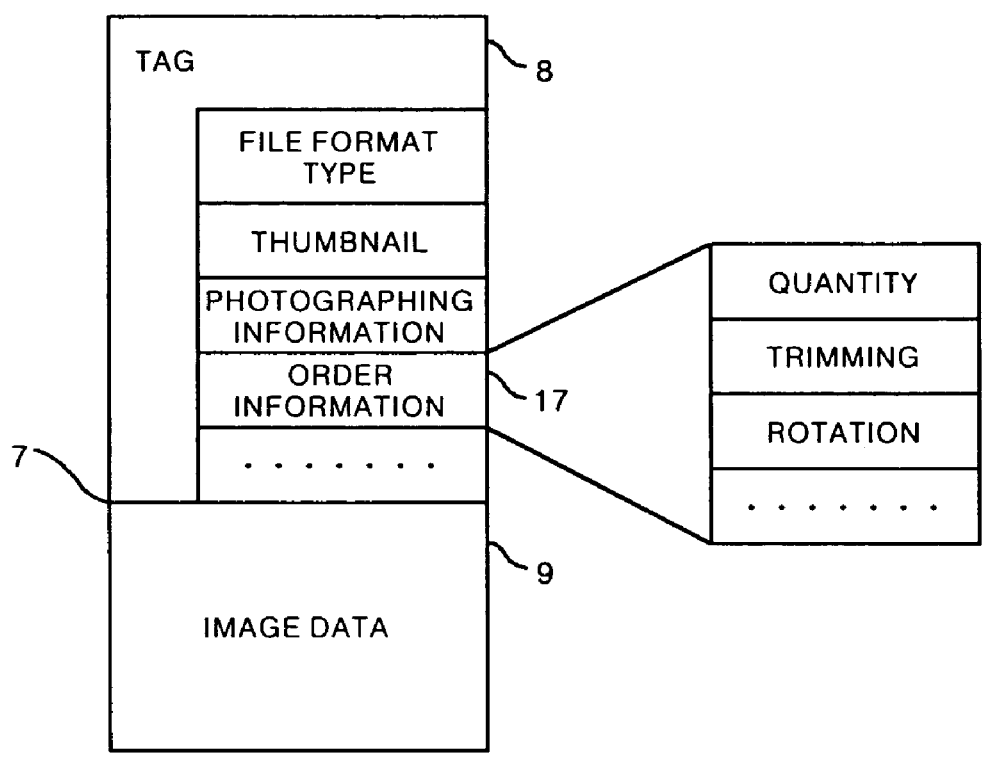
FIG. 5 is a diagram showing an example of an image file format.

In FIG. 5, an example of a format of the image file 7 is shown. The image file 7 has a tag area 8 for storing therein various kinds of accompanying information of image data 9. The tag area 8 has not only an area for order information 17 but also areas wherein photographing information, such as the format type of the image file, a thumbnail image at a low resolution, the date of photographing, and the exposure of the camera are described. As the order information 17, various kinds of items such as the quantity of prints, an image portion to be trimmed off, and a center and an angle of rotation, can be described.

Figures 6, 7:
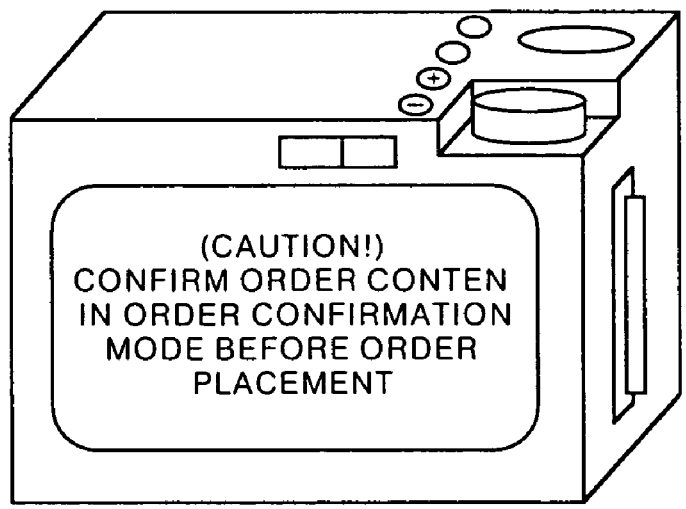
FIG. 6 is a diagram showing an example of an order file format.
FIG. 7 is a diagram showing an example of order confirmation urging screen.

In FIG. 6, an example of a format of the order file 6 is shown. In this format, the order information is described in two sections, namely a control information section for storing information regarding the order file itself, and a printing instruction section for describing a printing instruction. In the control information section, the version, the date of generation, and the like of the order file are described. In the printing instruction section, a specific printing instruction is described. The example shown in FIG. 6 has the instruction for generating 2 index prints wherein all image files having an extension .JPG are printed.

The digital camera 1a describes the instruction information received from the user in each area of the image file or the order file.

In a conventional order processing method, the memory card 2 having such information is provided as it is to a service provider. However, in the order processing method of the present invention, the order can be placed after the order confirmation operation has been carried out.

The order confirmation operation is carried out in the order confirmation mode. In the order confirmation mode, the user confirms the content of the order, such as the quantity of prints, on the screen shown in FIG. 2, and carries out the predetermined operation (such as pressing a button dedicated therefor) meaning order confirmation completion. The content of the order being displayed is then confirmed. When this operation has been carried out, the confirmed order information is recorded in the memory card 2.

In the order confirmation mode, an order having been confirmed once can be canceled. When an order cancellation operation has been carried out, the confirmed order information is also deleted from the memory card 2. Furthermore, in the order confirmation mode, orders recorded in each operation mode can be canceled collectively.

When a new printing instruction is input in the preview photographing mode, one-frame replay mode, or index replay mode after confirmed order information has been recorded in the memory card 2 following the order confirmation operation, the confirmed order is automatically canceled and the confirmed order information is deleted from the memory card 2.

When an image file is deleted in the erasing mode after the order confirmation operation, the confirmed order is also canceled automatically. When deletion of all frames is instructed in the erasing mode, or when the number of the image files in the memory card 2 becomes 0 as a result of deletion of one image, the order file is also deleted.

In this embodiment, confirmation and cancellation of an order can be carried out by changing the hidden property of an order file. In other words, when the order confirmation operation has been carried out, the hidden property of the order file is set to hidden (i.e. invisible), and the hidden setting is canceled when the order cancellation operation has been carried out or when a confirmed order is canceled automatically. When the property is set to hidden, presence of the order file is not known by the user, and once the order confirmation operation is carried out, its presence is notified to the user. In this manner, the user or the service provider can easily understand whether or not an order confirmation operation has been carried out.

The digital camera 1a in this embodiment displays a message on the monitor, as shown in FIG. 7 for example, for prompting execution of the order confirmation operation, in order to ensure the execution of the order confirmation operation, when the memory card is detached from the camera or when the power is switched off.

In the above embodiment, the order information is described in both the order file and the tag area of the image file, and the order is confirmed by changing the hidden property of the order file. However, other forms of order information or confirmed order information are also possible.

For example, the order information may be described only in either the order file or the image file. The confirmed order information may be described at the time of order confirmation by changing the read/write property of the order file to read-only, by describing a valid date of order placement in the order file, by describing a code or a key word expressing order confirmation completion in the order file, or by embedding a code expressing order confirmation completion in an image file having a smallest (or largest) frame number among the images whose output has been instructed, for example.

Table 1 below shows available forms of the confirmed order information in each form of the order information. When circles (○) are present in a column in Table 1, it is possible to use a plurality of these forms at the same time, in order to improve the reliability of the confirmed order information.

TABLE 1

| confirmed order information form | order information form | | |
|---|---|---|---|
| | order file + embedment into image file | order file only | embedment into image file only |
| use hidden property of order file | ○ | ○ | X |
| use read-only property of order file | ○ | ○ | X |
| describe a code in order file | ○ | ○ | X |
| use the date of order in order file | ○ | ○ | X |
| describe a code as a portion of order information embedded in image file | ○ | X | ○ |

○ available
X not available

The memory card 2 wherein the order information and the confirmed order information has been recorded is received by the order receiving apparatus 3 shown in FIG. 1. The order receiving apparatus 3 certifies the confirmed order information. When the order has been certified, the order receiving apparatus 3 obtains the image file recorded in the memory card 2 according to the order information, carries out necessary image processing, and instructs the photographic printer 4 to generate a print 10.

Figure 8:
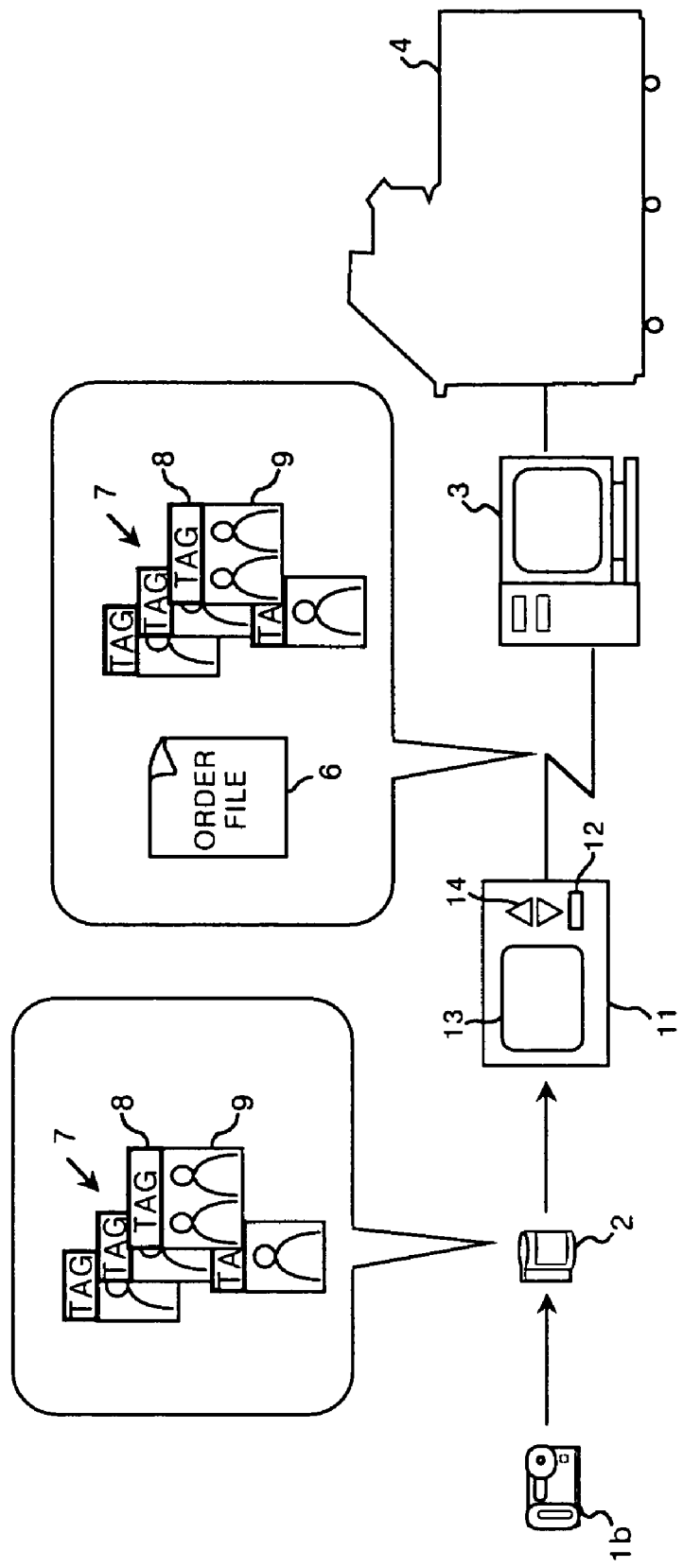
FIG. 8 is a diagram showing another embodiment of an order processing system of the present invention.

The function to generate the order information and to control the confirmed order information may be realized by a terminal dedicated for order information generation processing, instead of the digital camera. In FIG. 8, a dedicated terminal 11 generates the order information and confirms an order. In this embodiment, the digital camera 1a does not have the function to generate order information. The digital camera 1a does not need to comprise a liquid crystal display monitor.

The dedicated terminal 11 comprises a card reading unit 12 for reading the memory card 2 and for obtaining the image file 7, a display unit 13 for displaying the image file 7 having been read or various kinds of processing menus, and an instruction button 14 for selecting a menu option among the displayed menus. By using the dedicated terminal 11, the order information generating function and the confirmed order information controlling function equivalent to those of the digital camera 1a are provided.

The dedicated terminal 11 is connected to the order receiving apparatus 3 directly, or via a public telecommunication line or the Internet. In this manner, the generated order file 6 (including the confirmed order information) and the image file 7 can be transferred to the order receiving apparatus 3. Alternatively, the order file 6 or the like may be recorded in the memory card 2 wherein the image file 7 has been recorded and the file may be provided to the order receiving apparatus 3 via the memory card 2, as in the case of the embodiment shown in FIG. 1.

According to the embodiment shown in FIG. 8, a user who possesses a conventional digital camera which does not comprise the order confirming function can place an order according to the order processing method of the present invention.

What is claimed is:

1. An order processing method used in an image output service for a digital camera, the order processing method comprising the steps of:

obtaining image data by photographing an image and recording the image data into a recording medium or by reading the image data from the recording medium;

replaying the obtained image data as a visible image on a display medium;

receiving an output instruction regarding the image data, the output instruction being input from an input apparatus based on the replay of the image data;

generating order information describing the output instruction in a predetermined data format and recording the order information in the recording medium;

displaying on the display medium all image data output of which has been instructed and the content of the instruction regarding the image data so that a requester of the image output service can confirm the content of the output instruction;

certifying an order by recording confirmed order information in the recording medium when a predetermined order confirmation operation indicating that the requester has confirmed the content of the output instruction;

carrying out the image output service based on the order information recorded in the recording medium only when the confirmed order information has been recorded in the recording medium, and selecting for an image recording mode one of a printing mode and a non-printing mode based on a selection from a user, wherein a still image is recordable in the non-printing mode.

2. The order processing method of claim 1,
wherein the digital camera is capable of directly taking an image of a real object, and
wherein the display medium is capable of displaying the image of the real object when the image is taken and during order processing.

3. The order processing method of claim 1, wherein the steps of obtaining the image data, replaying the image data, receiving the output instruction, generating the order information, displaying on the display medium all image data output, and certifying the order are carried out by means all integrated physically within a single body of the digital camera.

4. The order processing method of claim 1, wherein when the image data is obtained by photographing the image, the image data is obtained without a need for conversion from a negative image to a positive image.

5. The order processing method of claim 1, wherein the step of photographing the image includes adjustably focusing the image prior to photographing the image.

6. An order processing system used in an image output service, the order processing system comprising an order information generating apparatus and an order receiving apparatus, the order information generating apparatus comprising:
   data obtaining means for obtaining image data by photographing an image and recording the image data into a recording medium or by reading the image data from the recording medium;
   display means for carrying out replay of the obtained image data as a visible image on a display medium;
   instruction receiving means for receiving an output instruction regarding the image data, the output instruction being input from an input apparatus based on the replay of the image data;
   order information recording means for generating order information describing the output instruction in a predetermined data format and recording the order information in a recording medium;
   order content confirming means for displaying on the display medium all image data, output of which has been instructed and the content of the instruction regarding the image data so that a requester of the image output service can confirm the content of the output instruction; and
   order certifying means for certifying an order by recording confirmed order information in the recording medium when a predetermined order confirmation operation indicating that the requester has confirmed the content of the output instruction;
the order receiving apparatus comprising:
   data reading means for reading the order information recorded in the recording medium;
   confirmed information certifying means for certifying whether or not the confirmed order information has been recorded in the recording medium; and
   output instructing means for instructing, based on the order information recorded in the recording medium, output of the image data to various kinds of output apparatuses only when the confirmed order information has been recorded in the recording medium,
wherein the order processing system further comprises a recording mode selector for selecting for an image recording mode one of a printing mode and a non-printing mode based on a selection from a user, wherein a still image is recordable in the non-printing mode.

7. The order processing system of claim 6,
wherein the digital camera is capable of directly taking an image of a real object, and
wherein the display means is capable of displaying the image of the real object when the image is taken and during order processing.

8. The order processing system of claim 6, wherein the data obtaining means, the display means, the instruction receiving means, the order information recording means, the order content confirming means, and the order certifying means are physically integrated in a single body of the digital camera.

9. The order processing system of claim 6, wherein when the image data is obtained by photographing the image, the image data is obtained without a need for conversion from a negative image to a positive image.

10. The order processing system of claim 6, wherein the data obtaining means includes an adjustable focusing mechanism capable of adjustably focusing the image prior to photographing the image.

11. An order information generating apparatus for a digital camera comprising:
   data obtaining means for obtaining image data by photographing an image and recording the image data into a recording medium or by reading the image data from the recording medium;
   display means for carrying out replay of the obtained image data as a visible image on a display medium;
   instruction receiving means for receiving an output instruction regarding the image data, the output instruction being input from an input apparatus based on the replay of the image data;
   order information recording means for generating order information describing the output instruction in a predetermined data format and recording the information in a recording medium;
order content confirming means for displaying on the display medium all image data output of which has been instructed and the content of the instruction regarding the image data so that a requester of an image output service can confirm the content of the output instruction;
   order certifying means for certifying an order by recording confirmed order information in the recording medium when a predetermined order confirmation operation indicating that the requester has confirmed the content of the output instruction; and
   a recording mode selector for selecting for an image recording mode one of a printing mode and a non-printing mode based on a selection from a user,
   wherein a still image is recordable in the non-printing mode, and
   wherein the data obtaining means, the display means, the instruction receiving means, the order information recording means, the order content confirming means, and the order certifying means are physically integrated in a single body of the digital camera.

12. The order information generating apparatus of claim 11,
wherein the digital camera is capable of directly taking an image of a real object, and wherein the display means is capable of displaying the image of the real object when the image is taken and during order processing.

13. The order information generating apparatus of claim 11, wherein when the image data is obtained by photographing the image, the image data is obtained without a need for conversion from a negative image to a positive image.

14. The order information generating apparatus of claim 11, wherein the data obtaining means includes an adjustable focusing mechanism capable of adjustably focusing the image prior to photographing the image.

15. An order receiving apparatus for use with a digital camera, which receives an order for an image output service by obtaining order information in a digital format, the order receiving apparatus comprising:
  data reading means for reading the order information describing an output instruction regarding image data from a recording medium;
  confirmed information certifying means for certifying whether or not confirmed order information indicating that a requester of the image output service has confirmed the content of the output instruction is recorded in the recording medium; and
  output instructing means for instructing, based on the order information recorded in the recording medium, output of the image data to various kinds of output apparatuses only when the confirmed order information is recorded in the recording medium,
  wherein each image data are recorded in the recording medium in one of a printing mode and a non-printing mode based on a selection from a user, wherein a still image is recordable in the non-printing mode.

16. The order receiving apparatus of claim 15,
  wherein the digital camera is capable of directly taking an image of a real object, and
  wherein a display of the digital camera is capable of displaying the image of the real object when the image is taken and during order processing.

17. A digital camera having an order information generating function, the digital camera comprising:
  photographing means for obtaining image data by photographing an image;
image recording means for recording the image data having been obtained in a recording medium;
  display means for carrying out replay of the obtained image data as a visible image on a monitor attached to the digital camera;
  instruction receiving means for receiving an output instruction regarding the image data, the output instruction being input from an operation button or the like based on the replay of the image data;
  order information recording means for recording order information describing the output instruction in a predetermined data format in the recording medium;
  order content confirming means for displaying on the monitor all image data output of which has been instructed and the content of the instruction regarding the image data so that a requester of an image output service can confirm the content of the output instruction; and
  order certifying means for certifying an order by recording confirmed order information in the recording medium when a predetermined order confirmation operation indicating that the requester has confirmed the content of the output instruction; and
  a recording mode selector for selecting for an image recording mode one of a printing mode and a non-printing mode based on a selection from a user,
  wherein a still image is recordable in the non-printing mode, and
  wherein the photographing means, the image recording means, the display means, the instruction receiving means, the order information recording means, the order content confirming means, and the order certifying means are physically integrated in a single body of the digital camera.

18. A digital camera having the order information generating function as claimed in claim 17, wherein the order information recording means describes the order information in an order file and records the order file in the recording medium, and the order certifying means certifies an order by setting a hidden property of the order file to visible.

19. A digital camera having the order information generating function as claimed in claim 17, wherein the order information recording means describes the order information in an order file and records the order file in the recording medium, and the order certifying means certifies an order by setting a read/write property of the order file to read-only.

20. A digital camera having the order information generating function as claimed in claim 17, wherein the order information recording means describes the order information in an order file and records the order file in the recording medium, and the order certifying means certifies an order by describing a valid date as order file generation date in the order file.

21. A digital camera having the order information generating function as claimed in claim 17, wherein the order information recording means describes the order information in an order file and records the order file in the recording medium, and the order certifying means certifies an order by describing a code meaning order confirmation completion in the order file.

22. A digital camera having the order information generating function as claimed in claim 17, wherein the image recording means records image data representing each image as an image file in the recording medium, and
  the order information recording means records the order information as accompanying information included in the image file, and
  the order certifying means certifies an order by describing a code meaning order confirmation completion in at least one image file in the recording medium.

23. The digital camera of claim 17,
  wherein the digital camera is capable of directly taking an image of a real object, and
    wherein the display means is capable of displaying the image of the real object when the image is taken and during order processing.

24. The digital camera of claim 17, wherein when the image data is obtained by photographing the image, the image data is obtained without a need for conversion from a negative image to a positive image.

25. The digital camera of claim 17, wherein the photographing means includes an adjustable focusing mechanism capable of adjustably focusing the image prior to photographing the image.

26. A digital camera having the order information generating function as claimed in claim 17, the digital camera further comprising confirmation operation canceling means for canceling the order confirmation operation when the confirmed order information is updated after having been recorded in the recording medium and/or when deletion of image data representing at least one image recorded in the recording medium is carried out.

27. A digital camera having the order information generating function as claimed in claim 26, wherein the confirmation operation canceling means deletes the order information when all image data, output of which has been instructed, are deleted from the recording medium as a result of the deletion.

28. The digital camera of claim 17, wherein the photographing means comprises recording mode means for enabling selection of one of printing and non-printing modes, wherein in the printing mode, the photographing means is set at maximum resolution.

29. The digital camera of claim 28, wherein in the non-printing mode, the photographing means allows manual setting of resolution and compression.

30. A digital camera having the order information generating function as claimed in claim 17, the digital camera further comprising operation urging means for carrying out display for prompting the order confirmation operation execution by the requester.

31. A digital camera having the order information generating function as claimed in claim 30, wherein the display is a message output on the monitor.

32. A digital camera having the order information generating function as claimed in claim 30, wherein the operation urging means carries out the display for a predetermined period after an operation to switch off a power of the digital camera has been carried out, and switches the power off after the predetermined period has elapsed.

33. A digital camera having the order information generating function as claimed in claim 30, wherein the recording medium is detachable from a body of the digital camera and the operation urging means carries out the display when the recording medium is pulled out from the body of the digital camera.

\* \* \* \* \*